United States Patent
Lu

(10) Patent No.: US 11,100,094 B2
(45) Date of Patent: Aug. 24, 2021

(54) TAKING SNAPSHOTS OF BLOCKCHAIN DATA

(71) Applicant: ALIPAY (HANGZHOU) INFORMATION TECHNOLOGY CO., LTD., Zhejiang (CN)

(72) Inventor: Zhonghao Lu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/085,165

(22) Filed: Oct. 30, 2020

(65) Prior Publication Data
US 2021/0049157 A1    Feb. 18, 2021

Related U.S. Application Data

(63) Continuation of application No. PCT/CN2019/121995, filed on Nov. 29, 2019.

(51) Int. Cl.
*G06F 16/00* (2019.01)
*G06F 16/23* (2019.01)
(Continued)

(52) U.S. Cl.
CPC ...... *G06F 16/2379* (2019.01); *G06F 16/2246* (2019.01); *G06F 16/2255* (2019.01); *G06F 16/27* (2019.01)

(58) Field of Classification Search
None
See application file for complete search history.

(56) References Cited

U.S. PATENT DOCUMENTS

| 2018/0101448 A1 | 4/2018 | Ventura et al. |
| 2019/0266577 A1 | 8/2019 | Baldet et al. |
(Continued)

FOREIGN PATENT DOCUMENTS

| AU | 2019203869 | 5/2019 |
| CN | 106055597 | 10/2016 |
(Continued)

OTHER PUBLICATIONS

Author: Guillaume Bonnot; Title: "Under The Hood: Extending Merkle Tree"; Date: Dec. 16, 2018; Publisher: CAASiope Labs; Pertinent Pages: whole document as attached (9 pages).*
(Continued)

*Primary Examiner* — Anhtai V Tran
(74) *Attorney, Agent, or Firm* — Fish & Richardson P.C.

(57) ABSTRACT

A computer-implemented method for blockchain data storage includes sending a marker message from a first blockchain node in a first shard of a blockchain network to a second blockchain node in a phosphor of the blockchain network; receiving a marker block from the second blockchain node, wherein the marker block is associated with the phosphor and includes the marker message; creating a first block associated with the first shard that includes a block associated with the phosphor that immediately precedes the marker block; creating a second block associated with the first shard that includes the marker block; generating, during creation of the second block associated with the first shard, a snapshot of state information corresponding to a newest block associated with the first shard; and storing the snapshot of the state information.

30 Claims, 8 Drawing Sheets

(51) Int. Cl.
  *G06F 16/27* (2019.01)
  *G06F 16/22* (2019.01)

(56) References Cited

U.S. PATENT DOCUMENTS

2019/0289068 A1* 9/2019 Ma .................. H04L 67/327
2020/0364205 A1* 11/2020 Novotny ............ G06F 16/217

FOREIGN PATENT DOCUMENTS

| CN | 106844523 | 6/2017 |
| CN | 107526775 | 12/2017 |
| CN | 108241743 | 7/2018 |
| CN | 108881274 | 11/2018 |

OTHER PUBLICATIONS

Extended Search Report in European Application No. 19883451.7, dated Dec. 3, 2020, 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/121995, dated Aug. 27, 2020, 7 pages.

* cited by examiner

TAKING SNAPSHOTS OF BLOCKCHAIN DATA

CROSS-REFERENCE TO RELATED APPLICATIONS

This application is a continuation of PCT Application No. PCT/CN2019/121995, filed on Nov. 29, 2019, which is hereby incorporated by reference in its entirety.

TECHNICAL FIELD

This specification relates to taking snapshots of blockchain data.

BACKGROUND

Distributed ledger systems (DLSs), which can also be referred to as consensus networks, and/or blockchain networks, enable participating entities to securely and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Blockchain-based programs can be executed by a distributed computing platform. For example, the distributed computing platform can include a virtual machine that provides the runtime environment for executing smart contracts. A blockchain computing platform can be viewed as a transaction-based state machine. State data in the platform can be assembled to a global shared-state referred to as a world state. The world state includes a mapping between account addresses and account states. The world state can be stored in content-addressed tree structures such as the Merkle Patricia tree (MPT).

Content-addressed state trees are incremental in nature. That is, changes of account states are reflected by adding new tree structures instead of updating values of the existing state tree. Therefore, the content-addressed state trees can grow very large in size as new transactions continuously enter into the blockchain. In some DLSs, every node stores an entire copy of the world state, which can take large amount of storage space. This is because all block data and state data are stored going back to the first transaction recorded to the blockchain, even if some state data associated with historical blocks are rarely accessed.

Moreover, because each blockchain node is responsible for processing the entire blockchain network's transactional load, for a blockchain network with a large amount of nodes, the computational and storage burden of each blockchain node can be very high.

Accordingly, it would be desirable for blockchain nodes to be able to selectively store state data associated with more frequently accessed blocks. It would also be desirable for a blockchain node to be responsible for processing and selectively storing only a portion of the transactional data of the blockchain network. As such, storage cost of the blockchain network can be saved without significantly affecting system performance and data integrity.

SUMMARY

Described embodiments of the subject matter can include one or more features, alone or in combination.

For example, in one embodiment, a computer-implemented method for storing blockchain data performed by a blockchain node is disclosed. The method comprises generating a snapshot of a current state tree associated with a fixed depth Merkle tree (FDMT) during creation of a block of a blockchain, wherein the current state tree stores state information corresponding to a newest block of the blockchain, and store the snapshot of the current state tree.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the FDMT includes a historic state tree that stores state information corresponding to every block of the blockchain.

In some embodiments, the historic state tree includes key-value pairs (KVPs), wherein a key of a KVP is a hash value of a corresponding value of the KVP.

In some embodiments, the current state tree includes KVPs, wherein a key of a KVP includes a node identifier (ID) corresponding to a node of the current state tree and a block ID corresponding to the newest block.

In some embodiments, the current state tree is associated with a contract account, and wherein the current state tree is a tree that encodes the storage content of the contract account.

In some embodiments, the snapshot includes a Merkle path associated with the contract account included in a world state tree associated with the newest block.

In some embodiments, the method further comprises adding, as an ID of the snapshot, a block ID associated with the newest block In some embodiments, the method further comprises receiving a request to retrieve the state information corresponding to the newest block; determining, through a local call, that the snapshot of the state information exists based on the ID of the snapshot; and providing the state information based on the snapshot in response to the request.

In some embodiments, the method further comprises deleting a historic state tree associated with the FDMT after the snapshot is stored.

In some embodiments, the snapshot is generated based on a checkpoint feature in RocksDB.

In another embodiment, another computer-implemented method for storing blockchain data performed by a blockchain node is disclosed. The method comprises sending a marker message from a first blockchain node in a first shard of a blockchain network to a second blockchain node in a phosphor of the blockchain network, receiving a marker block from the second blockchain node, wherein the marker block is associated with the phosphor and includes the marker message, creating a first block associated with the first shard that includes a block associated with the phosphor that immediately precedes the marker block, creating a second block associated with the first shard that includes the marker block, generating, during creation of the second block associated with the first shard, a snapshot of state information corresponding to a newest block associated with the first shard, and storing the snapshot of the state information.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the state information corresponding to the newest block is stored in an MPT.

In some embodiments, the state information corresponding to the newest block is stored in a current state tree associated with an FDMT.

In some embodiments, the FDMT includes a historic state tree that stores state information associated with every block of the blockchain.

In some embodiments, the method further comprises deleting the historic state tree after the snapshot of the state information is stored.

In some embodiments, the historic state tree includes KVPs, wherein a key of a KVP is a hash value of a corresponding value of the KVP.

In some embodiments, the current state tree includes KVPs, wherein a key of a KVP includes a node ID corresponding to a node of the current state tree and a block ID corresponding to the newest block.

In some embodiments, the current state tree is associated with a contract account, and wherein the current state tree is a tree that encodes the storage content of the contract account.

In some embodiments, the snapshot includes a Merkle path associated with the contract account included in a world state tree associated with the newest block.

In some embodiments, the method further comprises adding, as an ID of the snapshot, a block ID associated with the marker block or a block ID associated with the newest block.

In some embodiments, the method further comprises receiving a request to retrieve the state information corresponding to the newest block; determining, through a local call, that the snapshot of the state information exists based on the ID of the snapshot; and providing the state information based on the snapshot in response to the request.

In some embodiments, the marker block comprises one or more messages communicated between the first shard and a second shard of the blockchain network.

In some embodiments, the snapshot is generated based on a checkpoint feature in RocksDB.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
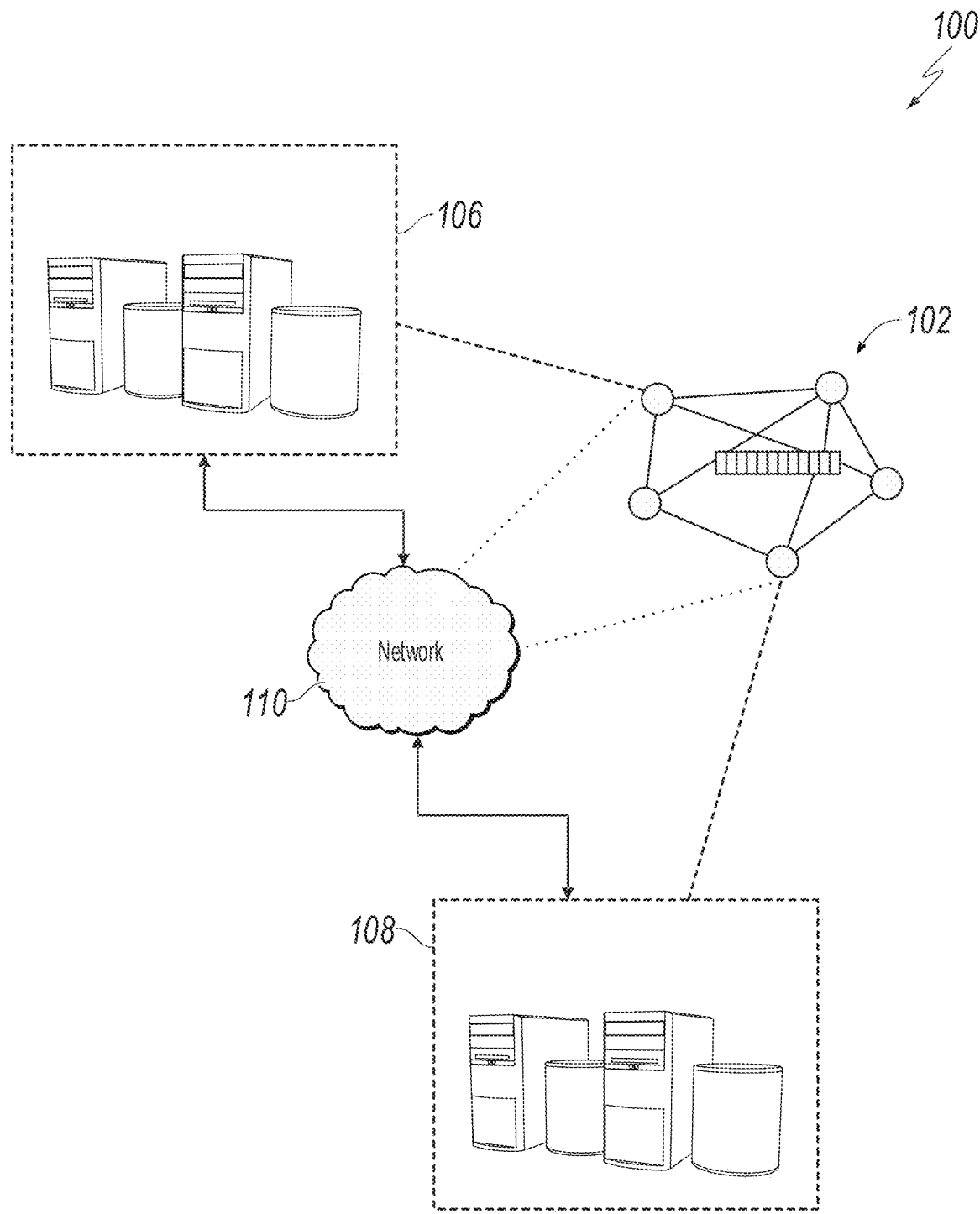
FIG. 1 depicts an example of an environment that can be used to execute embodiments of this specification.

This specification describes technologies for taking snapshots of blockchain data. In some blockchain networks, state information of blockchains can be stored in content-addressed tree structures, such as the Merkle Patricia tree (MPT) or the historic state tree under the fixed-depth Merkle tree (FDMT) data structure. Content-addressed state trees are incremental in nature. That is, changes of account states are reflected by adding new tree structures instead of updating values of the existing state tree. Therefore, the MPTs or historic state trees can grow large in size when blocks are continuously appended to the blockchain. Because most historic state data are associated with infrequently accessed historical blocks. Storing all historic state data can be inefficient in terms of storage resource usage.

In some embodiments, snapshot technologies can be implemented to strategically capture state information associated with selected blocks. For example, a smart contract can include instructions for taking snapshots of state information associated with newly appended blocks, such that state information associated with infrequently accessed or historic blocks is no longer stored to save storage space. The snapshot technologies can be implemented in not only regular blockchain networks, but also blockchain networks that have been divided into separate shards. For each shard, a separate set of blockchain nodes can perform consensus independently and generate state information associated with their particular shard. Snapshots can be coordinated among different shards such that complete state information of the entire blockchain is captured.

The techniques described in this specification produce several technical effects. As compared to storing both the current state information associated with the current block and the historic state information associated with all blocks of a blockchain, storing snapshots of state information associated with selected blocks of the blockchain can result in significant amount of cost savings on storage space.

In some embodiments, sharding technology can be used to partition blockchain nodes of a blockchain network into a plurality of shards. By using the sharding technology, a blockchain node is no longer responsible for processing the entire network's transactional load. Instead, the blockchain node only maintains information related to its own shard. As such, the computational and storage workload can be spread out across the blockchain network. The computational and storage burden of each blockchain node can be significantly reduced. Moreover, by implementing snapshot technology to each shard of a blockchain network, state information can be strategically selected by the blockchain nodes to achieve additional storage savings without significantly compromising data integrity of each shard.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing device that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
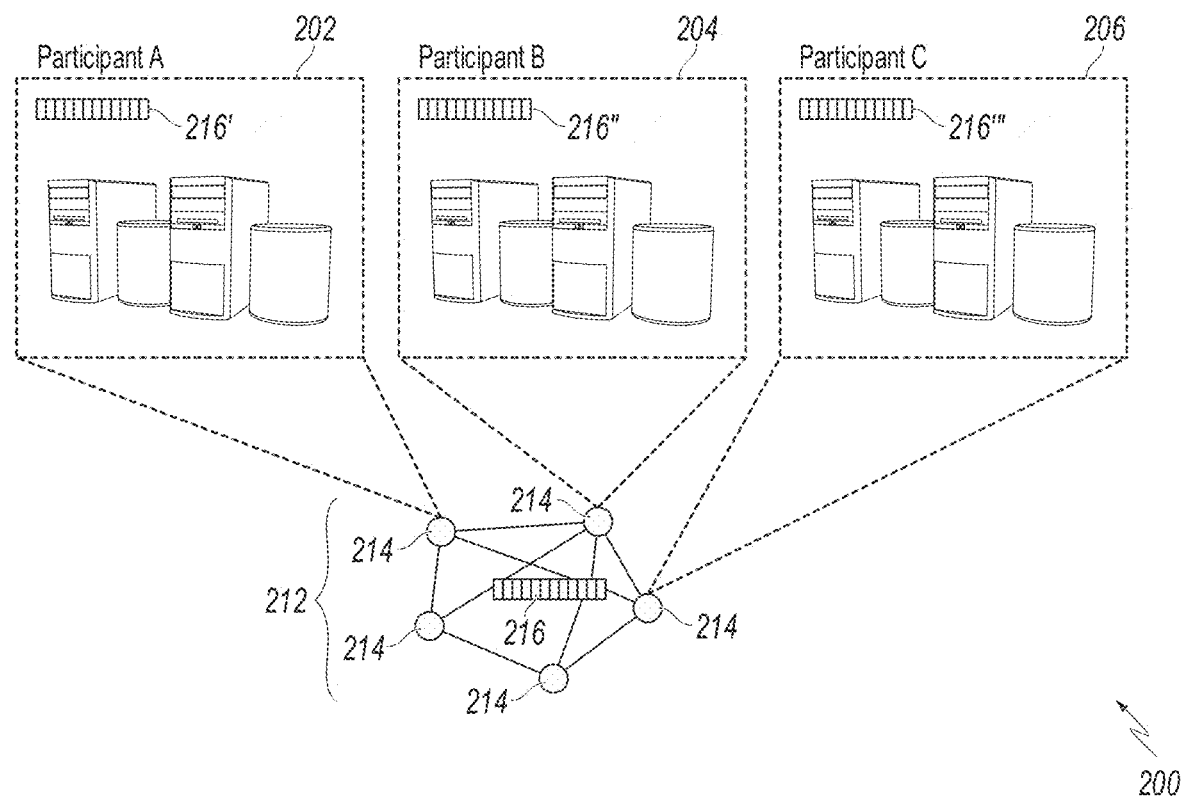
FIG. 2 depicts an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216'', and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

Figure 3:
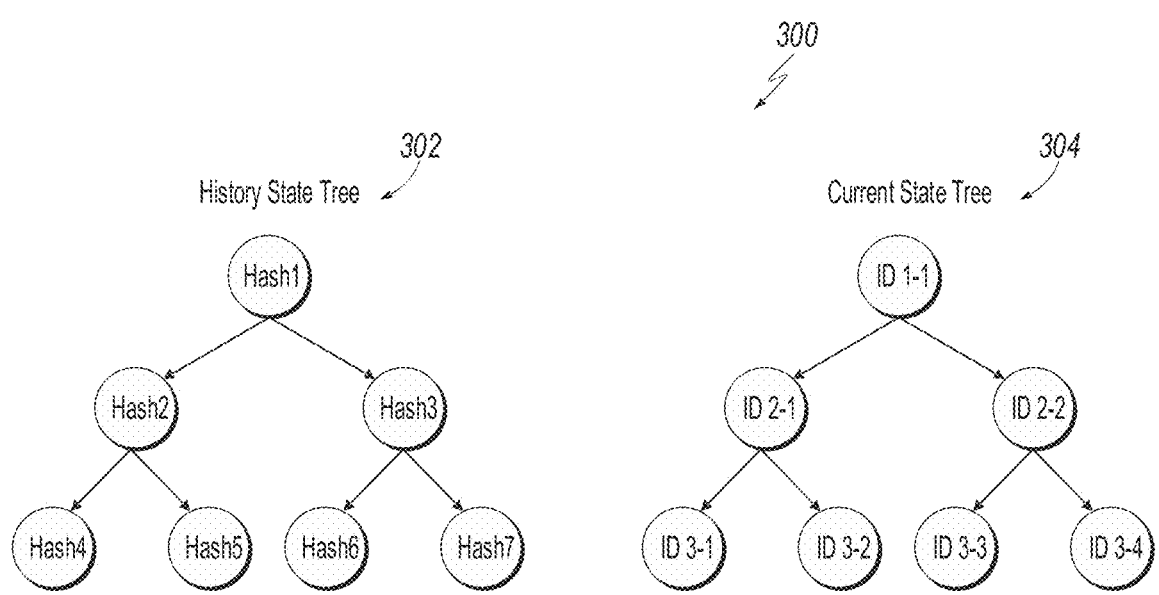
FIG. 3 depicts an example of a fixed depth Merkle tree (FDMT) data structure in accordance with embodiments of this specification.

FIG. 3 depicts an example of an FDMT data structure 300 in accordance with embodiments of this specification. Under FDMT, account states can be stored as key-value pairs (KVPs) in the structures of a historic state tree 302 and a current state tree 304. The keys in the KVPs correspond to addresses that uniquely identify values of blockchain accounts. The historic state tree 302 can include an entire copy of available state information of the blockchain. The current state tree 304 can include state information of a current block. When a new block is created, the current state tree 304 is updated with state information associated with the new block. Therefore, the size of the current state tree 304 can be significantly smaller than the size of the historic state tree 302.

In some embodiments, the current state tree 304 can be a location-addressed state tree. For a location-addressed state tree, a node value of the current state tree 304 can be retrieved based on a key (e.g., a node ID) that uniquely identifies a corresponding node of the current state tree 304. When a new node is added to the current state tree 304, a node value can be associated with its unique node ID (e.g., ID 1-1, ID 2-1, etc. of the current state tree 304) without regard to its content. The KVP of a node of the current state tree 304 can be expressed as <node ID, node value>.

In some cases, a key can further include a corresponding block ID associated with the node value. In such cases, the node ID can serve as prefix and the block ID can serve us suffix of the key. The KVP of the current state tree 304 can then be expressed as <node ID+block ID, node value>.

The historic state tree 302 can be a content-addressed state tree. For a content-addressed state tree, each account value can have a content address uniquely associated with the value to the information content itself. For example, the key of a node can be generated by hashing the value of the node. To retrieve information from a historic state tree 302, a content identifier can be provided, from which the location of the account value can be determined and retrieved. Similar to the Merkle Patricia tree (MPT), each node of the historic state tree 302 can include a hash value of a pointer (e.g., Hash1, Hash2, and Hash3 under the historic state tree 302) pointing to the next node of the tree. Following paths of the pointers, the leaf nodes have keys corresponding to end portions of the hash values (e.g., Hash4, Hash5, Hash6, and Hash7 under the historic state tree 302) and the values that the keys are paired with. KVPs of the historic state tree 302 can be expressed as <hash(node value), node value>.

Since node keys are dependent on node values for content-addressed trees, new state information can be added as additional tree structure to the historic state tree 302 rather than making changes to the existing tree in order to preserve existing tree structure and improve data storage/retrieval efficiency.

Figure 4:
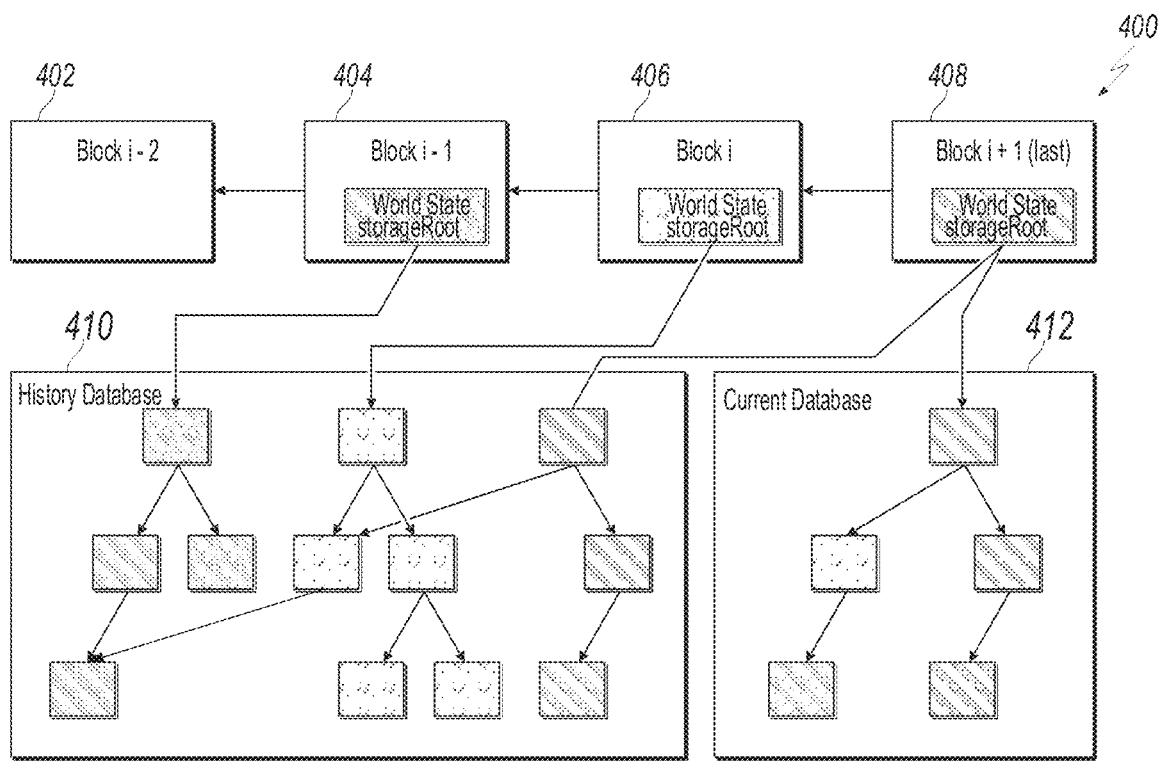
FIG. 4 depicts examples of databases for storing blockchain data in accordance with embodiments of this specification.

FIG. 4 depicts an example 400 of storing state information associated contract accounts of a blockchain in accordance with embodiments of this specification. The databases can be, for example, key-value databases such as levelDB or RocksDB. The databases can store data under the FDMT data structure, which includes a history database 410 for storing historic state tree and a current database 412 for storing current state tree. Of the four blocks depicted in FIG. 4, block i−2 402, block i−1 404, and block i 406 are historical blocks previously appended to the blockchain, while block i+1 408 is a current block. Each block can have a block header and a block body. The block header can include information such as a storageRoot of a contract account under a world state. The storageRoot can serve as a secure and unique identifier of the contract account state trees. In other words, the storageRoot can be cryptographically dependent on account states. The block body can include confirmed transactions of a corresponding account of a block.

As described, the history database 410 can store the historic state tree, and the current database 412 can store the current state tree. The historic state tree and current state tree can store historical and current account states, respectively. Account states can include information about blockchain account (e.g., number of transactions sent by an account). Each account can have an account state. As an example, Ethereum blockchain accounts can include externally owned accounts and contract accounts. Externally owned accounts can be controlled by private keys and are not associated with any code for executing smart contract. Contract accounts can be controlled by their contract code, which can be used for executing smart contract.

States of Ethereum accounts can include four components: nonce, balance, codeHash, and storageRoot. If the account is an externally owned account, the nonce can represent the number of transactions sent from the account address. The balance can represent the digital assets owned by the account. The codeHash can be the hash of an empty string. The storageRoot can be empty. If the account is a contract account, the nonce can represent the number of contracts created by the account. The balance can represent the digital assets owned by the account. The codeHash can be the hash of a virtual machine code associated with the account. The storageRoot can store a root hash associated with a storage tree or contract state tree. The contract state tree can store contract data. The contract state tree can also have a FDMT structure, which includes a current state tree and a historic state tree.

The historic state tree can include an entire copy of account states of the blockchain from a genesis block, and can be updated according to transaction executions. For example, a root hash stored in previous block i−1 404 is a root hash of the world state at the time block i−1 404 is completed. The world state is associated with all transactions stored in block i−1 404 and blocks prior to block i−1 404. Similarly, a root hash stored in the current block i+1 408 is a root hash of the world state associated with all transactions stored in block i+1 408 and blocks prior to block i+1 408.

The current state tree can include state information that is updated or added due to transactions being newly added to the current block i+1 408. As discussed in the description of FIG. 3, the historic state tree can store state information as KVPs expressed as <hash(node value), node value>, such that the node values can be content-addressable. In some embodiments, the current state tree can be location-addressed based on one or more location-related IDs. For example, the current state tree can store state information as KVPs expressed as <node ID, node value>, where the node values can be addressed based on their corresponding node IDs. As another example, the keys of the KVPs can be a combination of the node ID and the corresponding block ID of the node value. The node ID can serve as prefix and the block ID can serve us suffix of keys for traversing values of an FDMT or MPT.

Figure 5:
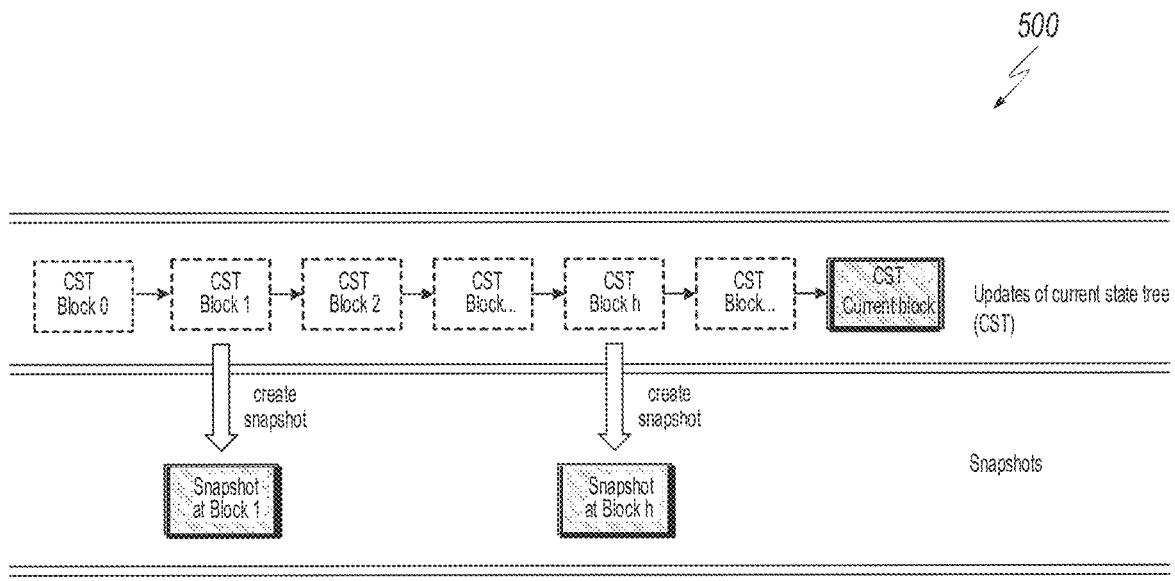
FIG. 5 depicts an example of a blockchain network using shared storage in accordance with embodiments of this specification.

FIG. 5 depicts an example 500 of executing snapshots in a smart contract in accordance with embodiments of this specification. At a high-level, snapshot technology can be used in operating systems or storage technologies. A snapshot can be an entire copy of a set of data at a certain time point (or checkpoint). In some cases, the snapshot can record a complete state of a system at the time the snapshot is taken. Snapshots can be easily rolled back to recover the original data.

As discussed earlier, the MPT and the historic state tree of the FDMT are content-addressable state trees. The content-addressable state trees are incremental in nature. That is, changes of account states are reflected by adding new tree structures instead of updating values of the existing state tree. Therefore, the historic state trees can grow large in size when blocks are continuously appended to the blockchain. Moreover, state data of a current block is separately stored in both the current state tree and historic state tree. Because most state data corresponding to historical blocks is infrequently accessed historic state data, storing all historic state data can be inefficient in terms of storage resource usage.

In some embodiments, snapshot technologies can be implemented in databases such as a RocksDB, LevelDB, or StateDB, among others. For example, the checkpoint feature in a RocksDB can be used to take snapshots of a running RocksDB database and save the snapshots in a specific directory. The checkpoints can be associated with points in time of the snapshots. In some embodiments, the checkpoint feature can be used to implement a snapshotable contract. The snapshotable contract can be a smart contract that includes instructions for taking snapshots of state information of a blockchain. For example, a smart contract can include instructions for taking snapshots of current state trees associated with a contract account during the consensus of block 1 and block h. During the consensus of block 1, the smart contract can trigger the first snapshot. Because the current state tree of block 1 has not been completed during the consensus of block 1, the first snapshot can be a snapshot of the current state tree of block 0. Similarly, the second snapshot taken during the consensus of block h can be a snapshot of the current state tree of block h−1. After the snapshots are taken, they can be stored in a specific directory of a database. In some embodiments, the snapshots can be strategically taken for state information associated with selected blocks that are frequently accessed. In some cases, the state data is stored in the FDMT. In such cases, the historic state tree of the FDMT associated with the corresponding contract account can be deleted from a blockchain node after the snapshots are stored to save storage space on the blockchain node.

In some embodiments, the snapshots associated with contract state trees can also include Merkle paths of storageRoots of the contract state trees under the world state tree, such that the simple payment verification (SPV) proofs can be provided when accessing the snapshots. In some embodiments, a snapshot ID can be associated with a snapshot. For example, the snapshot ID can be the block ID of the block that the corresponding current state tree is captured in the snapshot. In some embodiments, the snapshot ID can be the block ID of the block during the creation of which the snapshot was taken. In some embodiments, a list of snapshots instructed to be taken under a smart contract can also be provided, so that whether a snapshot of state information of a block exists can be easily determined. In some embodiments, a failure message can be provided if a local call is made to retrieve state information associated with a block at which the snapshot is unavailable.

As compared to storing both the current state tree associated with the current block and the historic state tree associated with all blocks of a blockchain, storing snapshots of state information associated with selected blocks of the blockchain can result in significant amount of cost savings on storage space.

Figure 6:
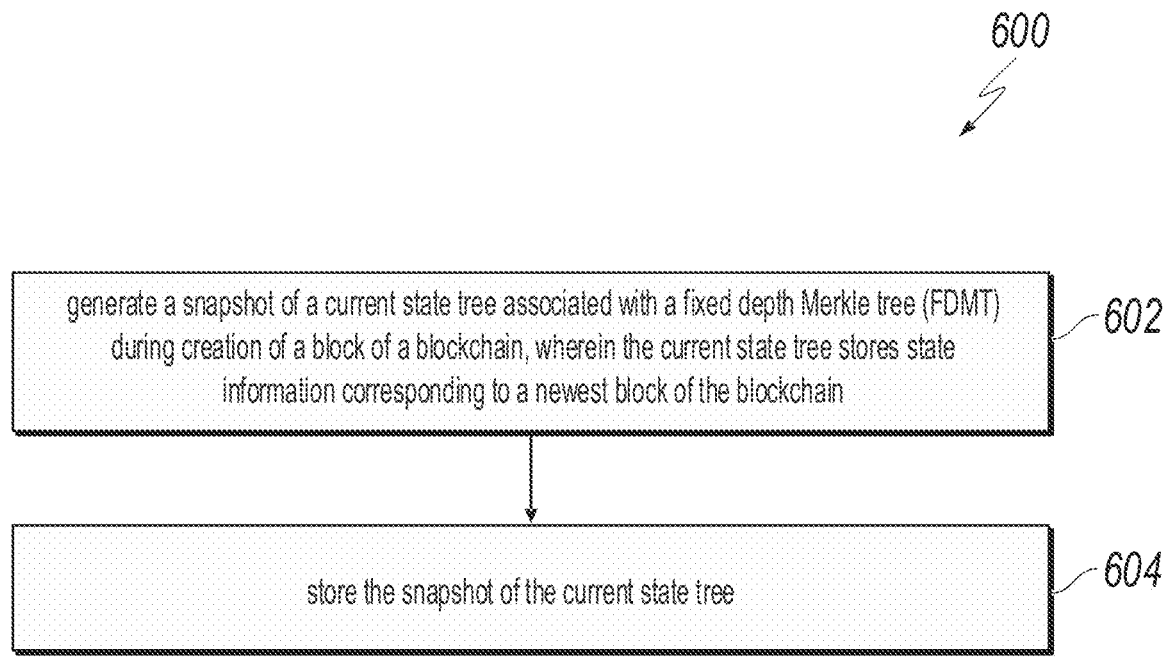
FIG. 6 depicts an example of a process that can be executed in accordance with embodiments of this specification.

FIG. 6 depicts an example of a process 600 that can be executed in accordance with embodiments of this specification. For convenience, the process 600 will be described as being performed by a system of one or more computers, located in one or more locations, and programmed appropriately in accordance with this specification. For example, a computing device in a computing system, e.g., the computing system 106, 108 of FIG. 1, appropriately programmed, can be a blockchain node that performs the process 600.

At 602, a blockchain node generates a snapshot of a current state tree associated with an FDMT during creation of a block of a blockchain, wherein the current state tree stores state information corresponding to a newest block of the blockchain. In some embodiments, the FDMT includes a historic state tree that stores state information corresponding to every block of the blockchain. In some embodiments, the historic state tree includes KVPs, wherein a key of a KVP is a hash value of a corresponding value of the KVP.

In some embodiments, the current state tree includes KVPs, wherein a key of a KVP includes a node ID corresponding to a node of the current state tree and a block ID corresponding to the newest block. In some embodiments, the current state tree is associated with a contract account, and wherein the current state tree is a tree that encodes the storage content of the contract account. In some embodiments, the snapshot includes a Merkle path associated with the contract account included in a world state tree associated with the newest block. In some embodiments, the process 600 further comprises adding, as an ID of the snapshot, a block ID associated with the newest block. In some embodiments, the snapshot is generated based on a checkpoint feature in RocksDB.

At 604, the blockchain node stores the snapshot of the current state tree. In some embodiments, the process 600 further comprises deleting a historic state tree associated with the FDMT after the snapshot is stored.

In some embodiments, the process 600 further comprises receiving a request to retrieve the state information corresponding to the newest block; determining, through a local call, that the snapshot of the state information exists based on the ID of the snapshot; and providing the state information based on the snapshot in response to the request.

Figure 7:
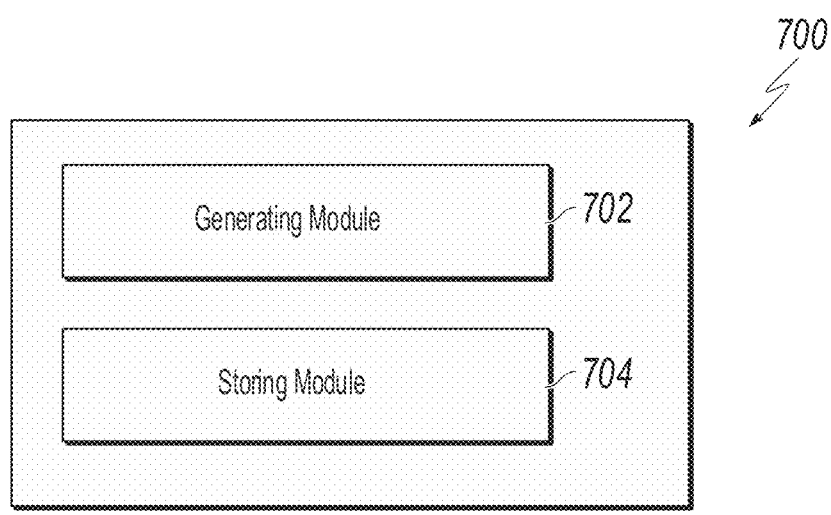
FIG. 7 depicts example of modules of an apparatus in accordance with embodiments of this specification.

FIG. 7 depicts example of modules of an apparatus 700 in accordance with embodiments of this specification. The apparatus 700 can be an example of an embodiment of a blockchain node configured to storing and processing blockchain data. The apparatus 700 can correspond to the embodiments described above, and the apparatus 700 includes the following: a generating module 702 that generates a snapshot of a current state tree associated with an FDMT during creation of a block of a blockchain, wherein the current state tree stores state information corresponding to a newest block of the blockchain, and a storing module 704 that stores the snapshot of the current state tree.

In some embodiments, the FDMT includes a historic state tree that stores state information corresponding to every block of the blockchain. In some embodiments, the historic state tree includes KVPs, wherein a key of a KVP is a hash value of a corresponding value of the KVP.

In some embodiments, the current state tree includes KVPs, wherein a key of a KVP includes a node ID corresponding to a node of the current state tree and a block ID corresponding to the newest block. In some embodiments, the current state tree is associated with a contract account, and wherein the current state tree is a tree that encodes the storage content of the contract account. In some embodiments, the snapshot includes a Merkle path associated with the contract account included in a world state tree associated with the newest block.

In some embodiments, the apparatus 700 further comprises an addition sub-module for adding, as an ID of the snapshot, a block ID associated with the newest block. In some embodiments, the apparatus 700 further comprises a reception sub-module for receiving a request to retrieve the state information corresponding to the newest block, a determination sub-module for determining, through a local call, that the snapshot of the state information exists based on the ID of the snapshot, and a provision sub-module for providing the state information based on the snapshot in response to the request.

In some embodiments, the apparatus 700 further comprises a deletion sub-module for deleting a historic state tree associated with the FDMT after the snapshot is stored. In some embodiments, the snapshot is generated based on a checkpoint feature in RocksDB.

Figure 8:
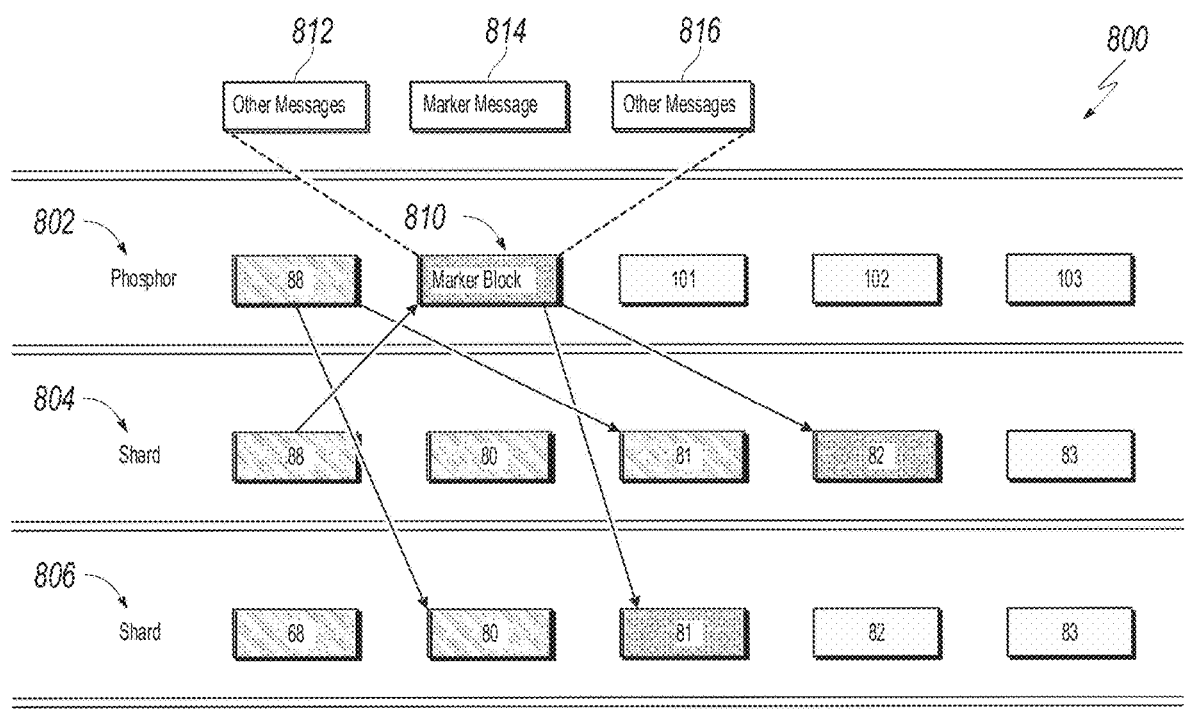
FIG. 8 depicts an example of executing snapshots in a blockchain network that employs sharding technology in accordance with embodiments of this specification.

FIG. 8 depicts an example 800 of executing snapshots in a blockchain network that employs sharding technology in accordance with embodiments of this specification. Sharding technology can be used to partition blockchain nodes of a blockchain network into a phosphor and a plurality of shards. As such, the computational and storage workload can be spread out across the blockchain network. More specifically, by using the sharding technology, a blockchain node is no longer responsible for processing the entire network's transactional load. Instead, the blockchain node only maintains information related to its own shard. Blockchain nodes in the phosphor can be used to serve blockchain nodes in the shards. Blockchain nodes in different shards can only communicate with each other through blockchain nodes in the phosphor. A high-level structure of a blockchain network applicable to this example 800 is depicted in FIG. 9.

Figure 9:
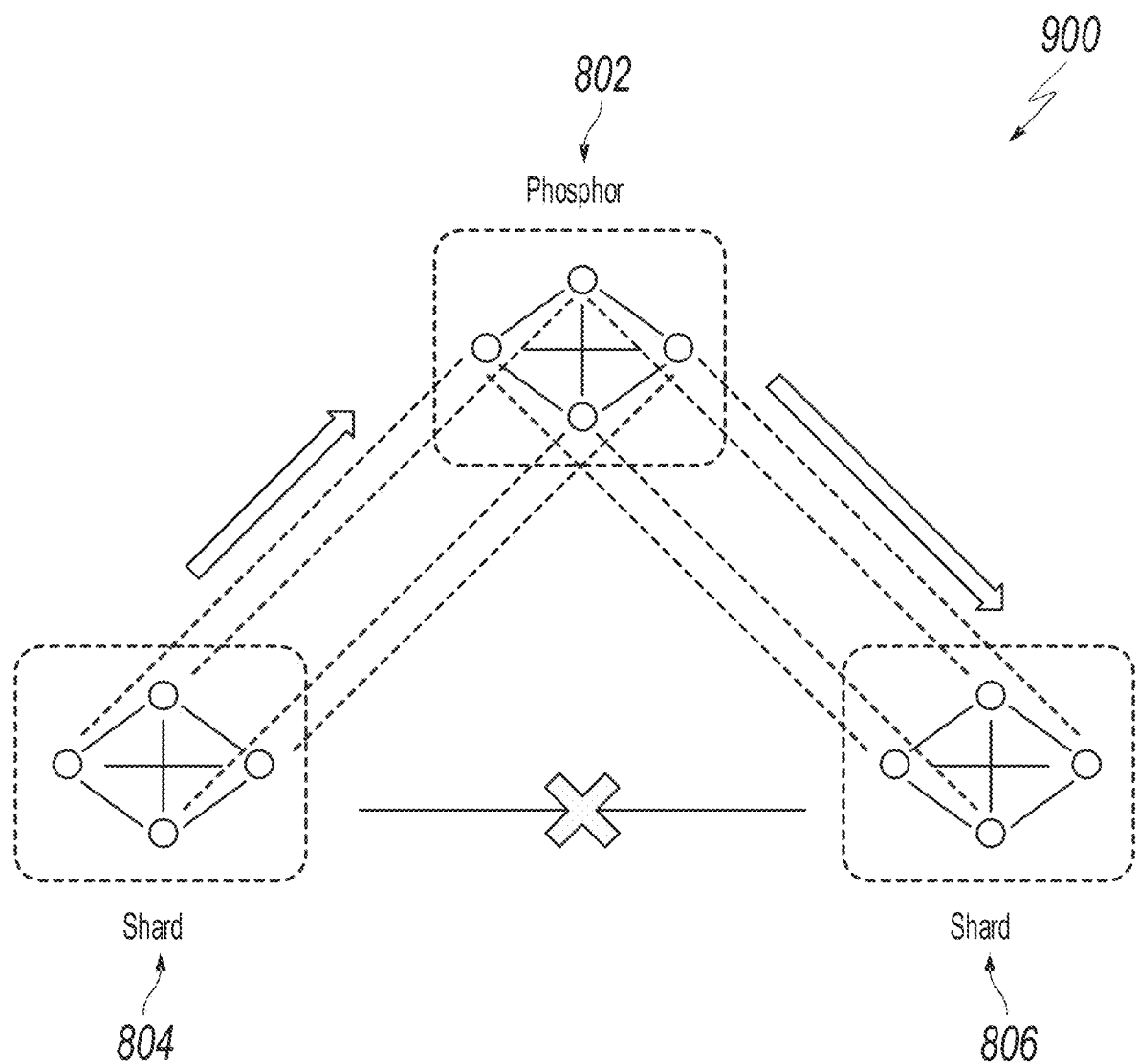
FIG. 9 depicts an example of a blockchain network that employs sharding technology in accordance with embodiments of this specification.

FIG. 9 depicts an example 900 of a blockchain network that employs sharding technology in accordance with embodiments of this specification. In the depicted example 900, the blockchain network includes a phosphor 802 and two shards: shard 804 and shard 806. Each of the phosphor 802 and the shards can include a plurality of blockchain nodes. In some blockchain networks, the blockchain nodes can form more than two shards in accordance with embodiments of this specification. The phosphor 802 can connect the shard 804 and shard2 806 to form a "spoke-hub" structure. The shard 804 and shard2 806 are isolated from each other and can communicate with each other through one or more predetermined blockchain nodes in the phosphor 802. Each of the shards includes a separate set of blockchain accounts, with each shard running consensus and smart contract independently for their respective set of blockchain accounts. An account associated with one shard cannot be viewed or accessed by blockchain nodes of another shard. A blockchain node can only participate in operations of one shard at a time. In some embodiments, the blockchain nodes in each shard can be determined and maintained by the phosphor 802 based on a smart contract.

If a transaction involves accounts of both the shard 804 and shard2 806, the tasks for completing the transaction can be performed in each shard in serial. The states of the transaction (e.g., in progress, submitted, or canceled) can be maintained by the phosphor 802. For example, when a transaction is completed, an account that initiates the transaction can broadcast to all accounts that participated in the transaction the updated account states through the phosphor 802. As another example, when a transaction fails, a blockchain node in a shard can notify blockchain nodes in other shards associated with the transaction to roll back to the original states before the transaction begins.

Referring back to FIG. 8, in the depicted example 800, a blockchain node in shard 804 can send a marker message to the phosphor 802 to mark a time point for taking a snapshot of the current state information associated with a contract account. Blockchain nodes in the phosphor 802 receive the marker message and other messages 812 and 816 before and after the marker message from blockchain nodes in shard 804 and shard 806. The blockchain nodes in the phosphor 802 can run consensus of the messages to generate phosphor blocks to append to the blockchain associated with the phosphor 802. The phosphor block that includes the marker message 814 can be called a marker block 810. The blockchain nodes in the phosphor 802 can then broadcast the messages as phosphor blocks to the blockchain nodes in shard 804 and shard 806. After receiving the phosphor blocks, the blockchain nodes in each shard run consensus of the phosphor blocks to generate shard blocks corresponding to each of the shards 804 and 806.

Because the blockchain nodes in shard 804 and shard 806 may run consensus at different speed and the shard blocks in each shard may have different sizes, the shard blocks that contain the marker block 810 can be different in each shard. In the depicted example 800, the marker block 810 is received by the blockchain nodes in shard 804 during the consensus of block 92. The marker block 810 is received by the blockchain nodes in shard 806 during the consensus of block 81.

In some embodiments, the blockchain nodes in the shards 804 and 806 can determine whether the marker block 810 is the first block of a shard block. Alternatively, the blockchain nodes in the shards can determine whether the phosphor block that immediately precedes the marker block 810 is in a newest block of the blockchain associated with the corresponding shard. For example, the blockchain nodes in shard 804 can determine whether the phosphor block 99 that immediately precedes the marker block 810 is included in shard block 91. The shard block 91 is the newest block during the creation of shard block 92 that includes the marker block 810. If yes, the blockchain nodes in shard 804 can call the checkpoint function to take a snapshot of the current state tree of shard block 91. Otherwise, a snapshot of the current state tree of shard block 92 needs to be taken during the creation of shard block 93. This is because the marker block 810 serves as a breakpoint of all the transactions before it. For example, if both phosphor block 99 and the marker block 810 are included in shard block 92, a snapshot taken during the creation of shard 92 will not include messages in phosphor block 99. On the other hand, if shard block 81 begins with the marker block 810, a snapshot taken during the creation of shard block 81 will include messages in phosphor block 99. In such cases, the snapshots of shard 804 and shard 806 may contain incomplete state information of the blockchain network, because the phosphor block 99 is only included in the snapshot of shard 806.

However, if the blockchain nodes in shard 804 determine that both the phosphor block 99 and the marker block 810 are included in shard block 92 and take the snapshot during the creation of shard block 93, then the state information of phosphor block 99 can be captured and marked by the marker block 810 in the snapshot of shard 804. The snapshots of shard 804 and shard 806 can then form complete state information of transactions before the marker block 810.

As described above, a snapshot of a shard block needs to include at least a phosphor block that immediately precedes the marker block 810 in order to capture the entire current state information associated with the blockchain network. In some embodiments, when blockchain nodes in a shard receive the marker block 810, they can create a shard block that includes the phosphor block that immediately precedes the marker block 810, but not the marker block 810 itself. The blockchain nodes can later create another shard block that includes the marker block 810.

For example, blockchain nodes in the shard 804 can create shard block 91 that includes the phosphor block 99 after receiving the marker block 810. The blockchain nodes can then create the shard block 92 to include the marker block 810. A snapshot associated with shard 804 can be taken during the creation of the shard block 92 that includes the marker block 810. As such, the snapshot of shard 804 can include state information associated with a newest block of shard 804. The newest block of shard 804 includes messages before the marker block 810. Similarly, blockchain nodes in the shard 806 can create shard block 80 that includes the phosphor block 99 and shard block 81 that includes the marker block 810. A snapshot associated with shard 806 can be taken during the creation of the shard block 81. As such, the snapshot of shard 806 can include state information associated with a newest block of shard 806. The newest block of shard 806 includes messages before the marker block 810. Therefore, the snapshots of shard 804 and shard 806 can then form complete state information of transactions before the marker block 810.

In some cases, the state data is stored in an FDMT. In such cases, the historic state tree of the FDMT can be deleted after the snapshots of selected current state trees are stored to save storage space. In some cases, the snapshot IDs of the snapshots of shard 804 and shard 806 can be the block ID of the marker block 810 or the block IDs of the corresponding shard blocks that the current state trees are captured in the snapshots.

Figure 10:
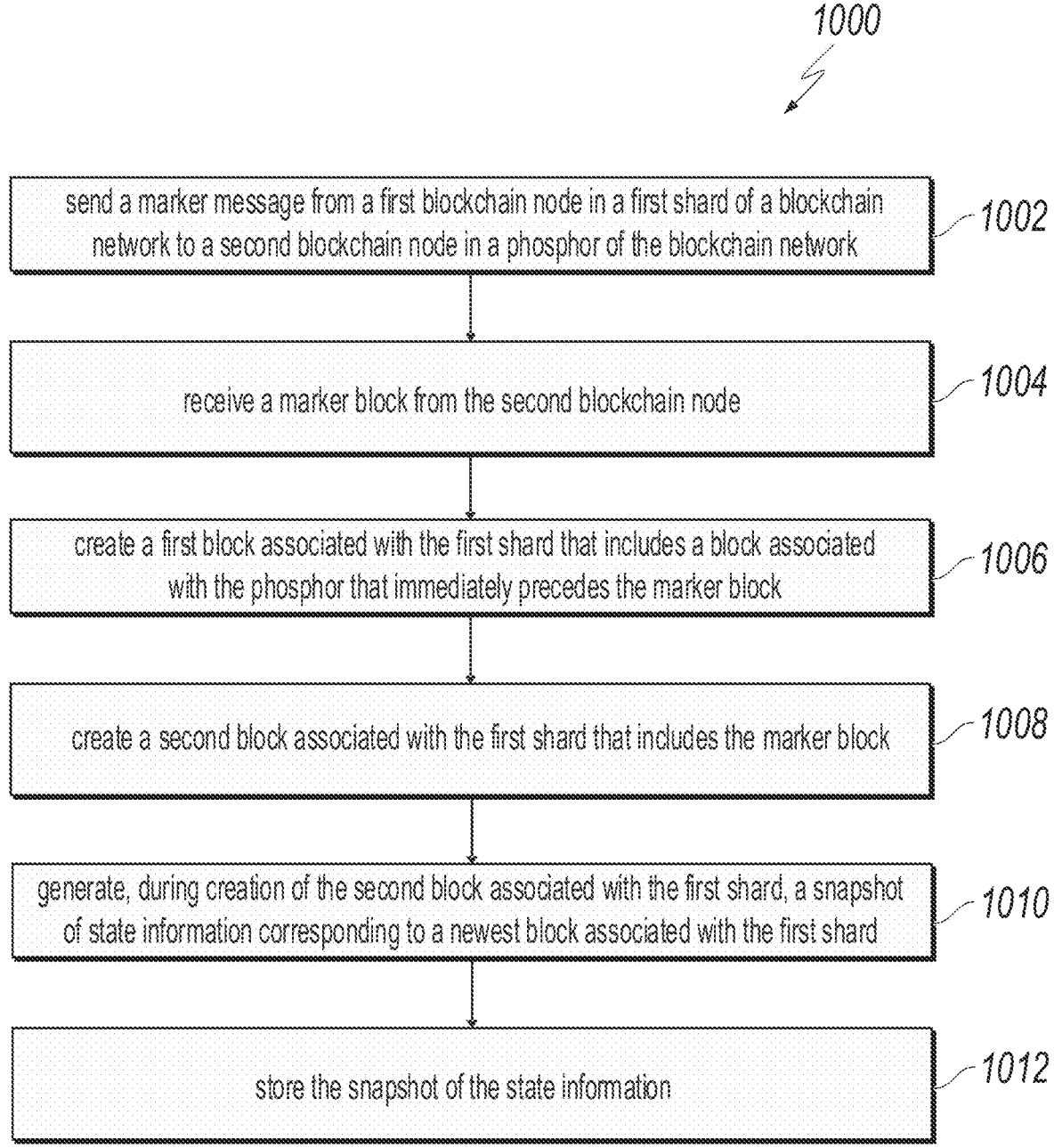
FIG. 10 depicts another example of process that can be executed in accordance with embodiments of this specification.

FIG. 10 depicts an example of a process 1000 that can be executed in accordance with embodiments of this specification. For convenience, the process 1000 will be described as being performed by a system of one or more computers, located in one or more locations, and programmed appropriately in accordance with this specification. For example, a computing device in a computing system, e.g., the computing system 106, 108 of FIG. 1, appropriately programmed, can be a blockchain node that performs the process 1000.

At 1002, a blockchain node sends a marker message from a first blockchain node in a first shard of a blockchain network to a second blockchain node in a phosphor of the blockchain network.

At 1004, the blockchain node receives a marker block from the second blockchain node, wherein the marker block is associated with the phosphor and includes the marker message. In some embodiments, the marker block comprises one or more messages communicated between the first shard and a second shard of the blockchain network.

At 1006, the blockchain node creates a first block associated with the first shard that includes a block associated with the phosphor that immediately precedes the marker block.

At 1008, the blockchain node creates a second block associated with the first shard that includes the marker block.

At 1010, the blockchain node generates, during creation of the second block associated with the first shard, a snapshot of state information corresponding to a newest block associated with the first shard. In some embodiments, the snapshot includes a Merkle path associated with the contract account included in a world state tree associated with the newest block. In some embodiments, the process 1000 further comprises adding, as an ID of the snapshot, a block ID associated with the marker block or a block ID associated with the newest block.

At 1012, the blockchain node stores the snapshot of the state information. In some embodiments, the state information corresponding to the newest block is stored in an MPT. In some embodiments, the state information corresponding to the newest block is stored in a current state tree associated with an FDMT. In some embodiments, the FDMT includes a historic state tree that stores state information associated with every block of the blockchain. In some embodiments, the snapshot is generated based on a checkpoint feature in RocksDB.

In some embodiments, the process 1000 further comprises deleting the historic state tree after the snapshot of the state information is stored. In some embodiments, the historic state tree includes KVPs, wherein a key of a KVP is a hash value of a corresponding value of the KVP.

In some embodiments, the current state tree includes KVPs, wherein a key of a KVP includes a node ID corresponding to a node of the current state tree and a block ID corresponding to the newest block. In some embodiments, the current state tree is associated with a contract account, and wherein the current state tree is a tree that encodes the storage content of the contract account.

In some embodiments, the process 1000 further comprises receiving a request to retrieve the state information corresponding to the newest block; determining, through a local call, that the snapshot of the state information exists based on the ID of the snapshot; and providing the state information based on the snapshot in response to the request.

Figure 11:
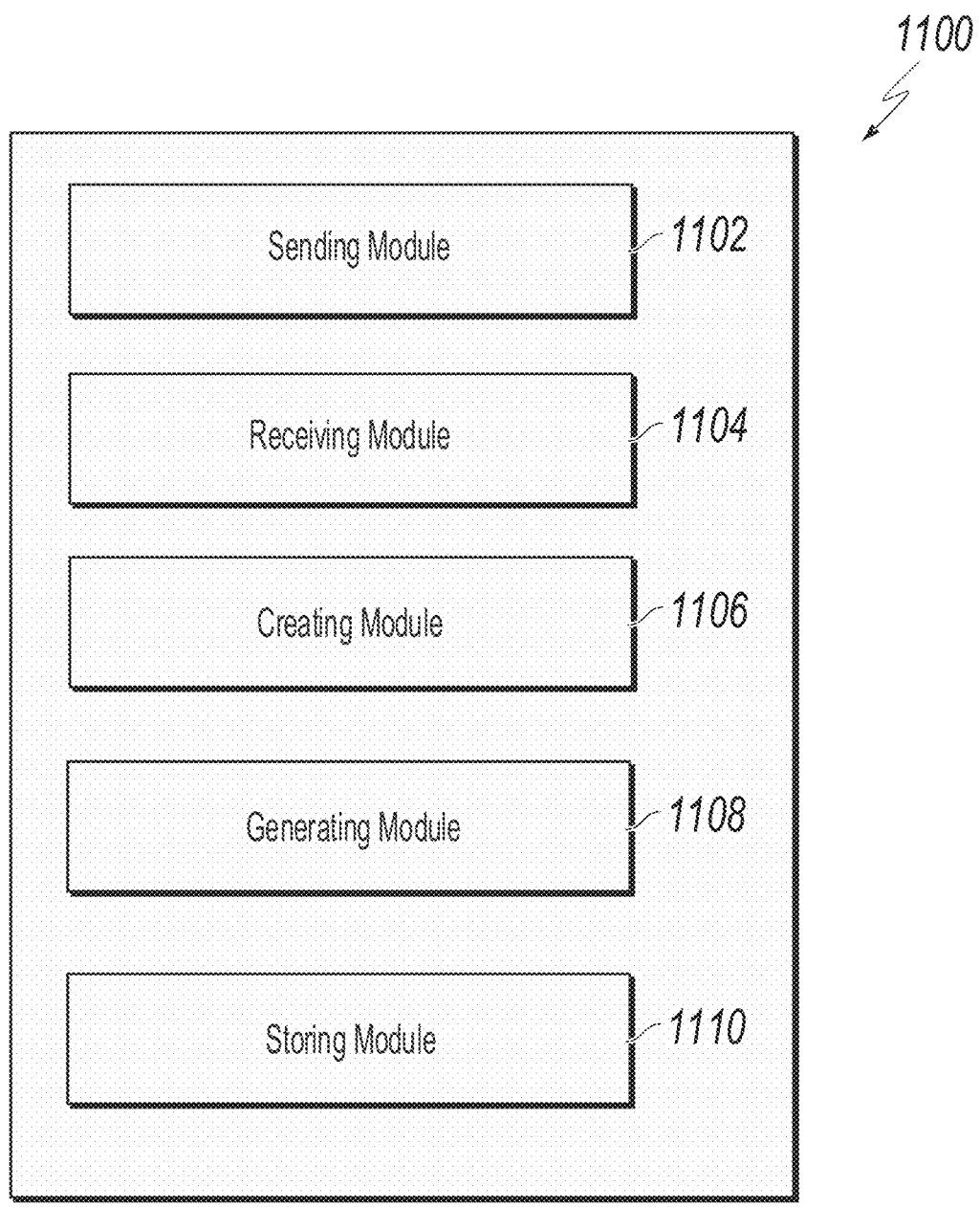
FIG. 11 depicts another example of modules of an apparatus in accordance with embodiments of this specification.

FIG. 11 depicts example of modules of an apparatus 1100 in accordance with embodiments of this specification. The apparatus 1100 can be an example of an embodiment of a blockchain node configured to storing and processing blockchain data. The apparatus 1100 can correspond to the embodiments described above, and the apparatus 1100 includes the following: a sending module 1102 that sends a marker message from a first blockchain node in a first shard of a blockchain network to a second blockchain node in a phosphor of the blockchain network, a receiving module 1104 that receives a marker block from the second blockchain node, wherein the marker block is associated with the phosphor and includes the marker message; a creating module 1106 that creates a first block associated with the first shard that includes a block associated with the phosphor that immediately precedes the marker block, a second block associated with the first shard that includes the marker block, a generating module 1108 that generates, during creation of the second block associated with the first shard, a snapshot of state information corresponding to a newest block associated with the first shard, and a storing module 1110 that stores the snapshot of the state information.

In some embodiments, the state information corresponding to the newest block is stored in an MPT. In some embodiments, the state information corresponding to the newest block is stored in a current state tree associated with an FDMT.

In some embodiments, the FDMT includes a historic state tree that stores state information associated with every block of the blockchain. In some embodiments, the apparatus 1100 further comprises a deletion sub-module for deleting the historic state tree after the snapshot of the state information is stored.

In some embodiments, the historic state tree includes KVPs, wherein a key of a KVP is a hash value of a corresponding value of the KVP. In some embodiments, the current state tree includes KVPs, wherein a key of a KVP includes a node ID corresponding to a node of the current state tree and a block ID corresponding to the newest block.

In some embodiments, the current state tree is associated with a contract account, and wherein the current state tree is a tree that encodes the storage content of the contract account. In some embodiments, the snapshot includes a Merkle path associated with the contract account included in a world state tree associated with the newest block.

In some embodiments, the apparatus 1100 further comprises an addition sub-module for adding, as an ID of the snapshot, a block ID associated with the marker block or a block ID associated with the newest block. In some embodiments, the apparatus 1100 further comprises a reception sub-module for receiving a request to retrieve the state information corresponding to the newest block; determining, through a local call, that the snapshot of the state information exists based on the ID of the snapshot, and a provision sub-module for providing the state information based on the snapshot in response to the request.

In some embodiments, the marker block comprises one or more messages communicated between the first shard and a second shard of the blockchain network. In some embodiments, the snapshot is generated based on a checkpoint feature in RocksDB.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIGS. 7 and 11, it can be interpreted as illustrating an internal functional module and a structure of a blockchain node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid-state drive, a random-access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random-access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for blockchain data storage, comprising:
    sending, by one or more processing devices, a marker message from a first blockchain node in a first shard of a blockchain network to a second blockchain node in a phosphor of the blockchain network, wherein the marker message is used to mark a time point for taking a snapshot of current state information associated with a contract account, wherein the blockchain network comprises the phosphor and a plurality of shards, and wherein blockchain nodes in one shard of the blockchain network only communicate with blockchain nodes in another shard of the blockchain network through blockchain nodes in the phosphor;
    receiving, by the one or more processing devices, a marker block from the second blockchain node, wherein the marker block is associated with the phosphor and includes the marker message;
    creating, by the one or more processing devices, a first block associated with the first shard that includes a block associated with the phosphor that immediately precedes the marker block;

creating, by the one or more processing devices, a second block associated with the first shard that includes the marker block;

generating, by the one or more processing devices during creation of the second block associated with the first shard, a snapshot of state information corresponding to a newest block associated with the first shard; and storing, by the one or more processing devices, the snapshot of the state information.

2. The computer-implemented method of claim 1, wherein the state information corresponding to the newest block is stored in a Merkle Patricia tree (MPT).

3. The computer-implemented method of claim 1, wherein the state information corresponding to the newest block is stored in a current state tree associated with a fixed depth Merkle tree (FDMT).

4. The computer-implemented method of claim 3, wherein the FDMT includes a historic state tree that stores historic state information associated with every block of the blockchain network.

5. The computer-implemented method of claim 4, further comprising:

deleting the historic state tree after the snapshot of the state information is stored.

6. The computer-implemented method of claim 5, wherein the historic state tree includes key-value pairs (KVPs), wherein a key of a KVP is a hash value of a corresponding value of the KVP.

7. The computer-implemented method of claim 5, wherein the current state tree includes KVPs, wherein a key of a KVP includes a node identifier (ID) corresponding to a node of the current state tree and a block ID corresponding to the newest block.

8. The computer-implemented method of claim 7, wherein the current state tree is associated with the contract account, and wherein the current state tree is a tree that encodes storage content of the contract account.

9. The computer-implemented method of claim 8, wherein the snapshot of the state information includes a Merkle path associated with the contract account included in a world state tree associated with the newest block.

10. The computer-implemented method of claim 1, further comprising:

adding, as an ID of the snapshot of the state information, a block ID associated with either the marker block or the newest block.

11. The computer-implemented method of claim 10, further comprising:

receiving a request to retrieve the state information corresponding to the newest block;

determining, through a local call, that the snapshot of the state information exists based on the ID of the snapshot of the state information; and providing the state information based on the snapshot of the state information in response to the request.

12. The computer-implemented method of claim 1, wherein the marker block comprises one or more messages communicated between the first shard and a second shard of the blockchain network.

13. The computer-implemented method of claim 1, wherein the snapshot of the state information is generated based on a checkpoint feature in RocksDB.

14. A non-transitory, computer-readable medium storing one or more instructions executable by a computer system to perform operations for blockchain data storage, the operations comprise:

sending a marker message from a first blockchain node in a first shard of a blockchain network to a second blockchain node in a phosphor of the blockchain network, wherein the marker message is used to mark a time point for taking a snapshot of current state information associated with a contract account, wherein the blockchain network comprises the phosphor and a plurality of shards, and wherein blockchain nodes in one shard of the blockchain network only communicate with blockchain nodes in another shard of the blockchain network through blockchain nodes in the phosphor;

receiving a marker block from the second blockchain node, wherein the marker block is associated with the phosphor and includes the marker message;

creating a first block associated with the first shard that includes a block associated with the phosphor that immediately precedes the marker block;

creating a second block associated with the first shard that includes the marker block;

generating, during creation of the second block associated with the first shard, a snapshot of state information corresponding to a newest block associated with the first shard; and storing the snapshot of the state information.

15. The non-transitory, computer-readable medium of claim 14, wherein the state information corresponding to the newest block is stored in a Merkle Patricia tree (MPT).

16. The non-transitory, computer-readable medium of claim 14, wherein the state information corresponding to the newest block is stored in a current state tree associated with a fixed depth Merkle tree (FDMT).

17. The non-transitory, computer-readable medium of claim 16, wherein the FDMT includes a historic state tree that stores historic state information associated with every block of the blockchain network.

18. The non-transitory, computer-readable medium of claim 17, wherein the operations further comprise:

deleting the historic state tree after the snapshot of the state information is stored.

19. The non-transitory, computer-readable medium of claim 18, wherein the historic state tree includes key-value pairs (KVPs), wherein a key of a KVP is a hash value of a corresponding value of the KVP.

20. The non-transitory, computer-readable medium of claim 18, wherein the current state tree includes KVPs, wherein a key of a KVP includes a node identifier (ID) corresponding to a node of the current state tree and a block ID corresponding to the newest block.

21. The non-transitory, computer-readable medium of claim 20, wherein the current state tree is associated with the contract account, and wherein the current state tree is a tree that encodes storage content of the contract account.

22. The non-transitory, computer-readable medium of claim 21, wherein the snapshot of the state information includes a Merkle path associated with the contract account included in a world state tree associated with the newest block.

23. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for blockchain data storage, comprising:

sending a marker message from a first blockchain node in a first shard of a blockchain network to a second blockchain node in a phosphor of the blockchain network, wherein the marker message is used to mark a time point for taking a snapshot of current state information associated with a contract account, wherein the blockchain network comprises the phosphor and a plurality of shards, and wherein blockchain nodes in one shard of the blockchain network only communicate with blockchain nodes in another shard of the blockchain network through blockchain nodes in the phosphor;

receiving a marker block from the second blockchain node, wherein the marker block is associated with the phosphor and includes the marker message;

creating a first block associated with the first shard that includes a block associated with the phosphor that immediately precedes the marker block;

creating a second block associated with the first shard that includes the marker block;

generating, during creation of the second block associated with the first shard, a snapshot of state information corresponding to a newest block associated with the first shard; and storing the snapshot of the state information.

24. The computer-implemented system of claim 23, wherein the state information corresponding to the newest block is stored in a Merkle Patricia tree (MPT).

25. The computer-implemented system of claim 23, wherein the state information corresponding to the newest block is stored in a current state tree associated with a fixed depth Merkle tree (FDMT).

26. The computer-implemented system of claim 25, wherein the FDMT includes a historic state tree that stores historic state information associated with every block of the blockchain network.

27. The computer-implemented system of claim 26, wherein the one or more operations further comprise:
deleting the historic state tree after the snapshot of the state information is stored.

28. The computer-implemented system of claim 27, wherein the historic state tree includes key-value pairs (KVPs), wherein a key of a KVP is a hash value of a corresponding value of the KVP.

29. The computer-implemented system of claim 27, wherein the current state tree includes KVPs, wherein a key of a KVP includes a node identifier (ID) corresponding to a node of the current state tree and a block ID corresponding to the newest block.

30. The computer-implemented system of claim 29, wherein the current state tree is associated with the contract account, and wherein the current state tree is a tree that encodes storage content of the contract account.

* * * * *